(12) United States Patent
Briggs et al.

(10) Patent No.: US 12,126,843 B2
(45) Date of Patent: *Oct. 22, 2024

(54) CENTRALIZED STREAMING VIDEO COMPOSITION

(71) Applicant: StreamYard, Inc., Wilmington, DE (US)

(72) Inventors: Dan Briggs, Vancouver, WA (US); Geige Vandentop, Vancouver, WA (US)

(73) Assignee: Stream Yard, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,874

(22) Filed: May 11, 2023

(65) Prior Publication Data
US 2023/0283813 A1 Sep. 7, 2023

Related U.S. Application Data

(63) Continuation of application No. 17/532,398, filed on Nov. 22, 2021, now Pat. No. 11,689,749.

(51) Int. Cl.
*H04N 21/2187* (2011.01)
*H04N 19/70* (2014.01)
(Continued)

(52) U.S. Cl.
CPC ......... *H04N 21/2187* (2013.01); *H04N 19/70* (2014.11); *H04N 21/2662* (2013.01); *H04N 21/2665* (2013.01); *H04N 21/2743* (2013.01)

(58) Field of Classification Search
CPC ............... H04N 21/2187; H04N 19/70; H04N 21/2662; H04N 21/2665; H04N 21/2743; H04N 21/2343; H04N 21/234309
See application file for complete search history.

(56) References Cited

U.S. PATENT DOCUMENTS 9,282,287 B1 3/2016 Marsh
9,414,018 B2 8/2016 Leske et al.
(Continued)

OTHER PUBLICATIONS

U.S. Appl. No. 17/843,276, Non-Final Office Action dated Oct. 20, 2023.
(Continued)

*Primary Examiner* — Adil Ocak
(74) *Attorney, Agent, or Firm* — Erise IP, P.A.

(57) ABSTRACT

Media, methods, and systems are disclosed for processing composite streaming video in connection with a centralized service. A request is received to initiate mixing a composite video live stream having a constituent stream quantity, one or more streaming video assets, and one or more media providers. If needed, one or more subsequent media servers are provisioned. The one or more constituent video streams and the one or more streaming video assets are received at a mixing server. The composite video live stream is rendered based thereon. The rendered composite video live stream is encoded into a standardized encoded video stream, which may be stored in one or more shared memories. The standardized encoded video stream is encoded into a provider-specific encoded media stream, which is then transmitted to a corresponding media provider.

20 Claims, 6 Drawing Sheets

(51) Int. Cl.
  *H04N 21/2662* (2011.01)
  *H04N 21/2665* (2011.01)
  *H04N 21/2743* (2011.01)

(56) References Cited

U.S. PATENT DOCUMENTS

| | | | |
|---|---|---|---|
| 10,091,290 B1 * | 10/2018 | Hansen | H04L 67/1097 |
| 10,127,714 B1 | 11/2018 | Kvaalen et al. | |
| 10,177,965 B1 * | 1/2019 | Joshi | H04L 67/141 |
| 10,974,140 B1 | 4/2021 | Verfaillie et al. | |
| 11,089,070 B2 | 8/2021 | Sehgal | |
| 11,100,197 B1 | 8/2021 | Bernardi | |
| 11,128,893 B2 | 9/2021 | Xue et al. | |
| 11,201,903 B1 | 12/2021 | Cabrido et al. | |
| 11,290,680 B1 | 3/2022 | Bright-Thomas | |
| 11,381,628 B1 | 7/2022 | Hesters | |
| 11,418,557 B1 | 8/2022 | Henry | |
| 11,496,713 B2 | 11/2022 | Shaikh et al. | |
| 11,539,919 B1 | 12/2022 | Rao et al. | |
| 11,689,749 B1 | 6/2023 | Briggs et al. | |
| 11,757,971 B2 | 9/2023 | Yang | |
| 11,785,056 B2 | 10/2023 | Cozzi et al. | |
| 2004/0032424 A1 | 2/2004 | Florschuetz | |
| 2010/0235857 A1 | 9/2010 | Lestage et al. | |
| 2011/0038281 A1 | 2/2011 | Saleem et al. | |
| 2011/0161843 A1 | 6/2011 | Bennett et al. | |
| 2012/0092435 A1 | 4/2012 | Wohlert | |
| 2013/0222601 A1 * | 8/2013 | Engstrom | H04N 21/4223 348/159 |
| 2014/0111597 A1 | 4/2014 | Anderson et al. | |
| 2014/0281007 A1 | 9/2014 | Lemmons et al. | |
| 2015/0067023 A1 | 3/2015 | Ai et al. | |
| 2015/0078295 A1 | 3/2015 | Mandyam et al. | |
| 2015/0088977 A1 | 3/2015 | Monesson | |
| 2015/0181254 A1 | 6/2015 | Ansari | |
| 2015/0245168 A1 | 8/2015 | Martin | |
| 2016/0373693 A1 | 12/2016 | Segal et al. | |
| 2018/0077469 A1 | 3/2018 | Geduldig et al. | |
| 2018/0143950 A1 | 5/2018 | Al-Arnaouti et al. | |
| 2018/0295175 A1 | 10/2018 | Smith et al. | |
| 2019/0245903 A1 | 8/2019 | Wallenstein et al. | |
| 2020/0288200 A1 | 9/2020 | Ho et al. | |
| 2020/0322397 A1 | 10/2020 | Totzke et al. | |
| 2021/0258364 A1 | 8/2021 | Yang | |
| 2021/0266613 A1 * | 8/2021 | da Silva Pratas Gabriel | H04N 21/8455 |
| 2021/0350830 A1 * | 11/2021 | Smith | H04N 21/8113 |
| 2021/0360048 A1 | 11/2021 | Sodagar et al. | |
| 2021/0402294 A1 | 12/2021 | Kanaya et al. | |
| 2022/0256253 A1 | 8/2022 | Lazar et al. | |
| 2023/0199239 A1 | 6/2023 | Robinson et al. | |

OTHER PUBLICATIONS

U.S. Appl. No. 17/843,276 Notice of Allowance issued Feb. 9, 2024.
U.S. Appl. No. 17/843,276, Corrected Notice of Allowance issued Mar. 22, 2024.

* cited by examiner

CENTRALIZED STREAMING VIDEO COMPOSITION

CROSS-REFERENCE TO RELATED APPLICATIONS

This patent application is a continuation application claiming priority benefit, with regard to all common subject matter, of U.S. patent application Ser. No. 17/532,398, filed Nov. 22, 2021, and entitled "CENTRALIZED STREAMING VIDEO COMPOSITION," which is hereby incorporated by reference in its entirety into the present application.

TECHNICAL FIELD

Embodiments of the invention generally relate to low-load processing of composite streaming video in connection with centralized services. More specifically, embodiments of the invention relate to technologies for mixing multiple video streams into a composite video stream while offloading associated processing overhead from client devices to one or more centralized services.

Live streaming composite video requires combining multiple video streams with other graphical layout components, including graphical assets for augmenting (e.g., branding) a produced composite video stream. Especially when a presenter needs to combine multiple video streams to form the composite video stream, such as in the case of a video stream of a moderated panel, any such client device that performs the mixing would have significant technical requirements for the computational aspects of mixing multiple video streams into a composite video stream. In general, it is desirable to allow speakers to use devices with moderate computational capabilities such as smartphones, tablets, and other low computational power computing devices. As such, improved techniques are needed for mixing multiple video streams into a composite video stream while offloading associated processing overhead from client devices to one or more centralized services.

SUMMARY

Embodiments of the invention address the above-identified need by providing mechanisms for mixing multiple video streams into a composite video stream while offloading associated processing overhead from client devices to one or more centralized services. In particular, in a first embodiment, the invention includes one or more non-transitory computer-readable media storing computer-executable instructions that, when executed by a processor, perform a method of processing composite streaming video in connection with a centralized service, the method comprising: receiving, at the centralized service, a request to initiate mixing a composite video live stream, the request indicating: a plurality of constituent video streams, one or more streaming video assets, at least one rendering template, and a media provider for disseminating the composite video live stream; receiving, at a mixing server, the one or more constituent video streams and the one or more streaming video assets; rendering the composite video live stream based on the one or more constituent video streams and the one or more streaming video assets in an encoding browser on the mixing server, the encoding browser having a simulated screen; capturing the rendered composite video live stream from the simulated screen as a standardized encoded video stream format; in response to determining that the media provider is configured to receive a specific media stream format, encoding the standardized encoded video stream into the specific encoded media stream format; and transmitting the specific encoded media stream format to the media provider.

In a second embodiment, the invention includes a method of processing composite streaming video in connection with a centralized service, the method comprising: receiving, at the centralized service, a request to initiate mixing a composite video live stream, the request indicating: a plurality of constituent video streams, one or more streaming video assets, at least one rendering template, and a media provider for disseminating the composite video live stream; receiving, at a mixing server, the one or more constituent video streams and the one or more streaming video assets; rendering the composite video live stream based on the one or more constituent video streams and the one or more streaming video assets in an encoding browser on the mixing server, the encoding browser having a simulated screen; capturing the rendered composite video live stream from the simulated screen as a standardized encoded video stream format; in response to determining that the media provider is configured to receive a specific media stream format, encoding the standardized encoded video stream into the specific encoded media stream format; and transmitting the specific encoded media stream format to the media provider.

In a third embodiment, the invention includes system comprising at least one processor and at least one non-transitory memory storing computer executable instructions that when executed by the processor cause the system to carry out actions comprising: receiving, at the centralized service, a request to initiate mixing a composite video live stream, the request indicating: a plurality of constituent video streams, one or more streaming video assets, at least one rendering template, and a media provider for disseminating the composite video live stream; receiving, at a mixing server, the one or more constituent video streams and the one or more streaming video assets; rendering the composite video live stream based on the one or more constituent video streams and the one or more streaming video assets in an encoding browser on the mixing server, the encoding browser having a simulated screen; capturing the rendered composite video live stream from the simulated screen as a standardized encoded video stream format; in response to determining that the media provider is configured to receive a specific media stream format, encoding the standardized encoded video stream into the specific encoded media stream format; and transmitting the specific encoded media stream format to the media provider.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "composite video live streaming" means streaming, substantially in real time, a composite video stream. In general, such a composite video stream may comprise a graphical background, one or more video streams, and other graphical layout components such as scrolling text, etc. Composite video live streaming may involve providing a proprietary or standardized video stream to a media provider, whose media platform may be leveraged to scale out a substantially live broadcast to a multitude of viewers of the live stream. Media providers include, inter alia, FACEBOOK, LINKEDIN, YOUTUBE, PERISCOPE, and TWITCH.

In some embodiments, a composite video live stream may be produced for streaming to a virtual event hosting platform. As used herein a "virtual event hosting platform" means an immersive, interactive online conference-hosting platform. Such platforms allow meeting participants to view presentations, participate in event sessions, network online, exchange virtual business cards, and engage in networking opportunities while preserving a record of connections made while attending a virtual event. A virtual event hosting platform may also enable hosting of in-person events as well as hybrid events that are hosted both in-person and virtually (online). A "virtual event hosting system" is an instantiation of a set of technical resources that provide for hosting of one or more virtual events in a virtual event hosting platform. In these embodiments, centralized mixing of composite video live streaming is employed to permit presenters on a virtual event hosting platform to use low computing power client devices to provide their portion of the live stream and permit the composite video live stream to be mixed in connection with centralized services. The centrally mixed composite video live stream is then distributed by one or more virtual event hosting systems to any number of participants viewing one or more events on the virtual event hosting platform.

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

Figure 1:
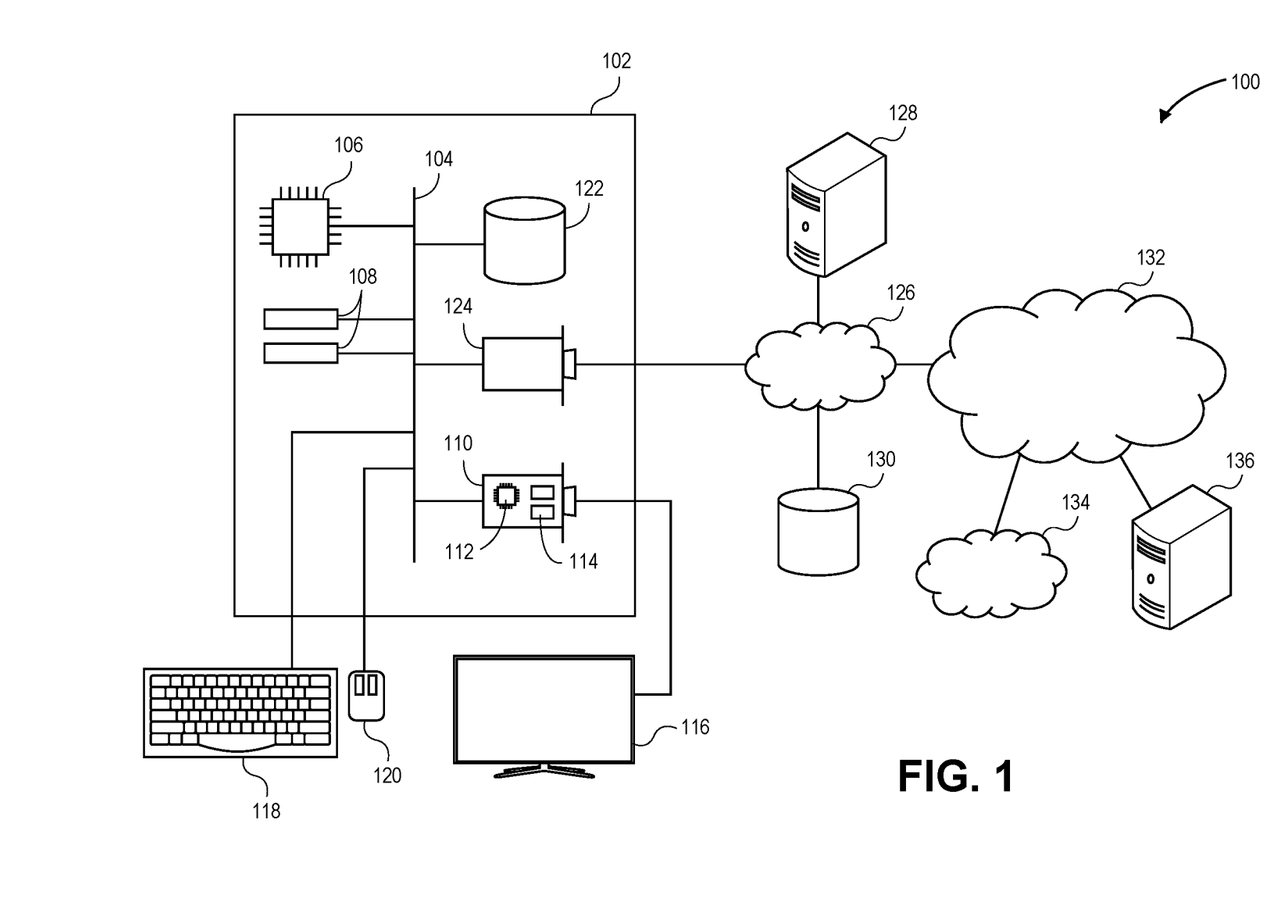
FIG. 1 depicts an exemplary hardware platform for certain embodiments of the invention.

FIG. 1 illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 124 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Such non-transitory, computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
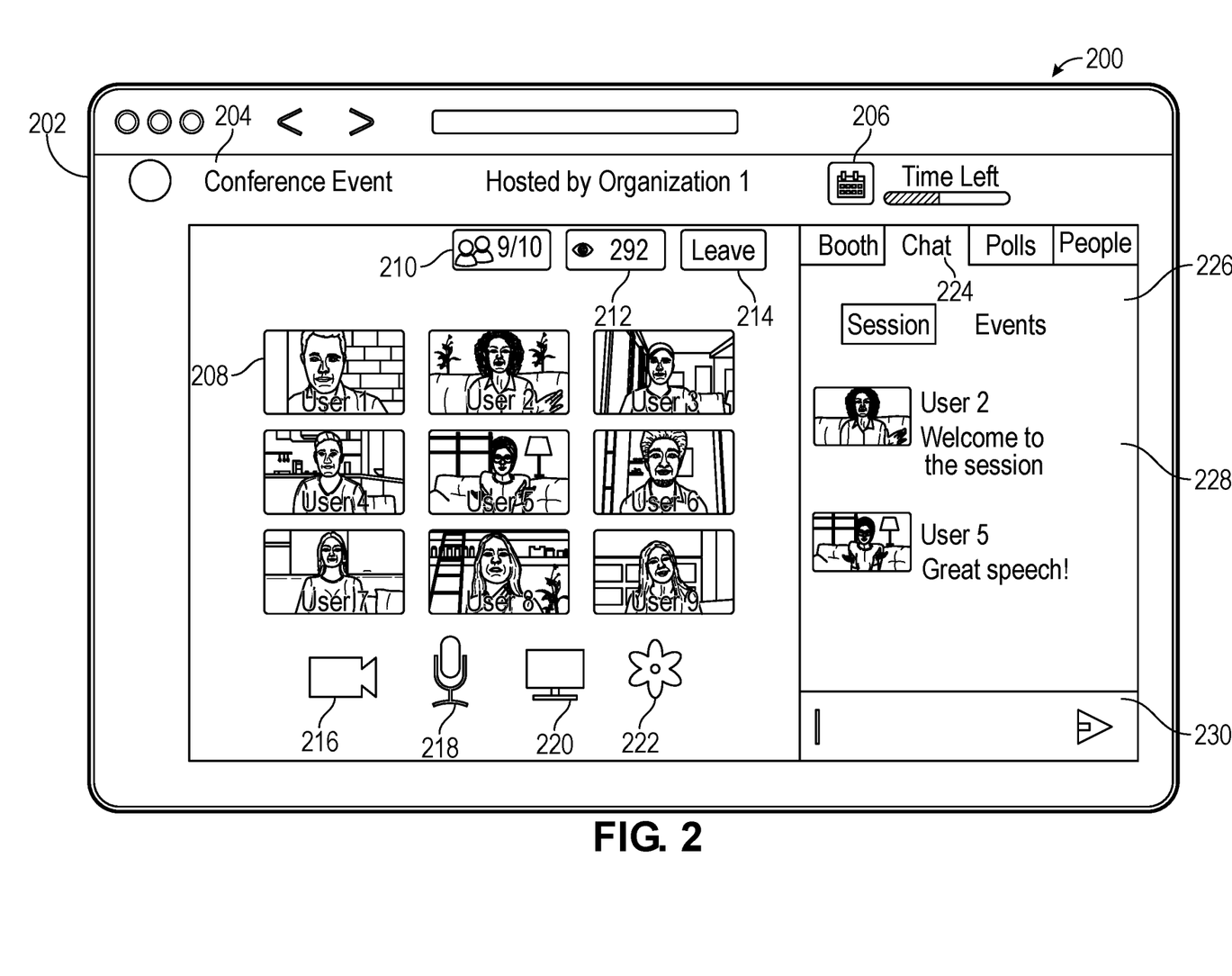
FIG. 2 depicts a representative user interface illustrating a composite video stream in the context of a virtual event hosting system.

FIG. 2 depicts a representative user interface 200 illustrating a composite video stream in the context of a virtual event hosting system. In some embodiments, session user interface 202 includes a plurality of video windows 208 each associated with an individual video stream corresponding to a respective user. In some embodiments, the video windows 208 may be included as part of a composite video stream mixed in connection with a centralized mixing service as explained in connection with the present teachings. For example, embodiments are contemplated in which a mixing server mixes a plurality of individual video streams into a mixed video stream including the plurality of video windows 208. Accordingly, the mixing server may be able to edit and apply layout changes to adjust the presentation of the video windows 208 within the graphical user interface 200. In some embodiments, up to twenty video windows 208 may be included on the graphical user interface 200 at a time such that the windows may be displayed at a reasonable size. Alternatively, in some embodiments, more or fewer video windows 208 may be included. Further still, in some embodiments, a size of the video windows may be adjusted based at least in part on the number of users and/or user activity. For example, in some embodiments, it may be desirable to automatically adjust the size of at least one of the video windows based on determining that a participant user is actively speaking.

In other embodiments, session user interface 202 may be accessed by selecting a session option of viewing option interface object 226. In some such embodiments, session user interface 202 may be associated with a breakout session of an event provided in connection with a virtual event hosting platform. For example, in some embodiments, attendees of an event may be divided out into a plurality of sessions. Accordingly, sessions may provide a virtual environment for users to talk amongst themselves resulting in a more personal experience. Embodiments are contemplated where one to nine presenting users present a topic to thousands of viewers in an event stage and then the users are separated into a plurality of sessions to discuss the topic and ask questions about the topic.

In another example, the session user interface 202 is used by a group of participant users to discuss a topic associated with an event. Accordingly, users 1-9 may be joined into a session group such that the video streams of each user are shared directly with the other users using, for example, a web real-time message transport protocol (RTMP). In some embodiments, a plurality of viewing users may tune in to view the discussion, as denoted by the viewers indicator 212 indicating a number of viewing users. Accordingly, in such embodiments, individual video streams corresponding to participant users 1-9 are mixed into a composite video stream and provided to various viewing users. For example, participant users 1-9 may receive a studio view corresponding to their own audio and video as well as the other nine users with which the presenting user is interacting.

In some embodiments, graphical user interface 200 includes event title 204 for the event and schedule interface object 206. In some embodiments, schedule interface object 206 may be selected to access an event schedule for the event which may be predefined for the event and may be updated during the event. Additionally, in some embodiments, schedule interface object 206 includes an indication of an amount of time remaining for the event, as shown. For example, the indication of time remaining may show the progress of the event with respect to the total event time. The indication may appear as a progress bar, as shown, but may alternatively or additionally include the time remaining as an hour and minute value or as a percentage of the total time for the event.

In some embodiments, one or more indicator objects are provided, such as participants indicator 210 indicating a number of active participants and attendee indicator 212 indicating a number of attendees watching the composite video stream. In some embodiments, exit interface object 214 may be included, which may exit the event or the current video session in response to user actuation. As such, embodiments are contemplated in which exit interface object 214 may be used, for example, to leave a meeting, end a video stream, or disconnect from a video stream. Additionally, included in connection with graphical user interface 200 are camera interface object 216, microphone interface object 218, screen interface object 220, and settings interface object 222. In some embodiments, camera interface object 216 and microphone interface object 218 may be used to toggle activation of the user's camera and microphone respectively. Accordingly, a user may select camera interface object 216 to stop sharing the user's video data and select microphone interface object 218 to optionally mute the user's microphone.

Screen interface object 220 may be selected to share the user's screen. For example, embodiments are contemplated in which screen interface object 220 switches video data that is shared from the camera video data to the user's screen. Accordingly, the user may be able to share live video footage of the user's computer screen or a screen from another user device with presenting users and other attendees. Further, embodiments are contemplated in which the user may simultaneously share the user's screen and video data from the user's camera. Further still, in some embodiments, screen interface object 220, when selected, presents the user with options for selecting which specific screen or window to share, for example, where the user has multiple screens and application windows open at once.

Settings interface object 222, when selected, may present the user with a set of options to change various settings associated with the event, the video streaming service, and the graphical user interface 200. For example, in some embodiments, the settings interface object 222 allows the user to adjust various settings such as, switching the active input devices and output devices for audio and video, change microphone monitoring settings, change output volume, adjust video quality, and other related settings.

In some embodiments, graphical user interface 200 further includes one or more selectable tabs 224, such as, for example, a booth tab, a chat tab, a polls tab, and a people tab, as shown. Here, the booth tab may be used to provide a plurality of virtual booths allowing individuals or organizations to present relevant event information. In some embodiments, the chat tab may be used to provide a messaging environment for various users, as will be described in further detail below. The polls tab may provide a way for users to give answers to polling questions. For example, a participant user may present a polling question such that attendees can access the polls tab to provide answers to a polling question. Results of the polling may then be forwarded to the participant user or may be available to the attendees after a polling time has expired or once every user has answered the polling question. The people tab may be selected to present information about the people in the event or in a specific session. In some embodiments, the people tab may include biography information and contact information for each speaker at the event.

In some embodiments, the graphical user interface 200 may further include a viewing option interface object 226, which may be used to select the viewing option that is displayed in the graphical user interface 200. For example, a user may select between an event option and a session option, as will be described in further detail below. In some embodiments, the event option may be selected to view a main stage of an event and the session option may be selected to view a breakout session of the event.

In some embodiments, messaging window 228 may be included allowing users to communicate via textual messages or multimedia messages. Accordingly, the messaging window 228 may present a plurality of user messages from various users. Embodiments are contemplated in which both presenting users and attendees are able to interact within messaging window 228. Alternatively, in some embodiments, messaging window 228 may be restricted to presenting users or to other specific users. Additionally, message input interface object 230 may be included allowing the user to compose and send a message to be posted in the messaging window visible to other users. In some embodiments, the messages may include any of textual communications or file attachments, reactions, emojis, and other types of message communications.

Figure 3A:
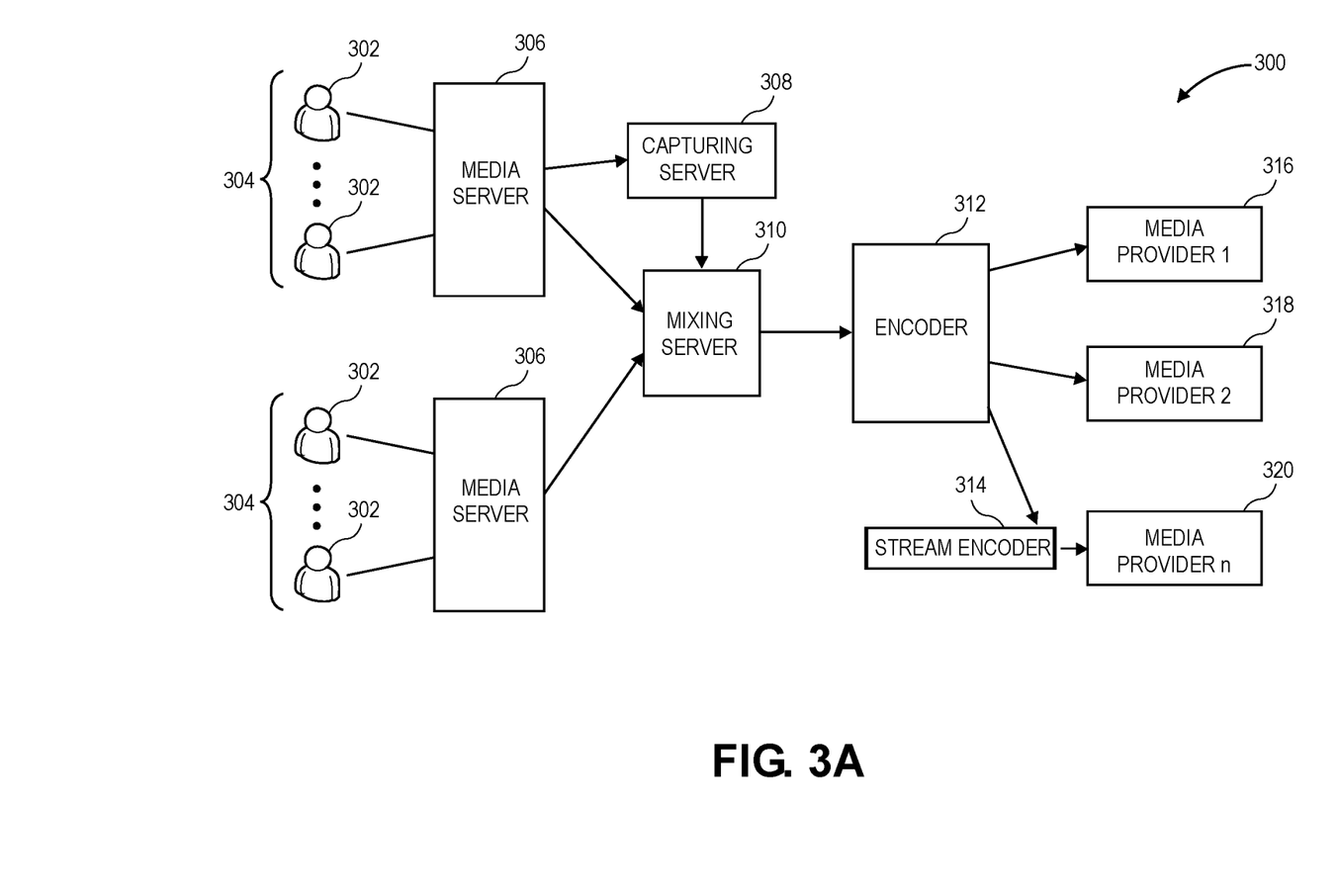
FIG. 3A illustrates elements of a system for carrying out embodiments of the invention.

FIG. 3A illustrates elements of a system 300 for carrying out embodiments of the invention. In some embodiments, users 302 are grouped into studios 304 for connecting to a single media server 306. In these embodiments, associating a group of users 302 in a particular studio 304 with a single media server 306 has the benefit of eliminating a need for multiple media servers 306 to perform inter-server communication. In these embodiments, a number of users 302 in a particular studio 304 is small enough (on the order of ten or so) that a single instance of a media server 306 is adequate to receive from and transmit various video streams associated with studio 304.

In some embodiments, users 302 may use devices with low computational power to record a single stream of video and stream that video to media server 306. In some embodiments, where users 302 are on a relatively low-bandwidth connection, a lossy compression may be employed so that a particular video stream is able to keep up within the constraints of the low-bandwidth connection. In some such embodiments, where lossy compression is employed for the live stream, a lossless version of the recording is persisted locally, for example, on a storage medium associated with a client device of user 302 that has only a low-bandwidth connection. In such embodiments, once the live streaming has concluded, or in the case where a high-bandwidth connection is encountered, the lossless recording of the recorded video is uploaded to media server 306 and subsequently forwarded on to capturing server 308. In some embodiments, the lossless recording of the recorded video is transmitted directly to capturing server 308. In alternative embodiments, where user 302 has a high-bandwidth connection, the lossless recording may be streamed substantially simultaneously with the compressed stream that is used to render the composite video stream.

In some embodiments, the video streams may be mixed and rendered on a web page by a simulated browser in connection with the mixing server. Embodiments are contemplated in which a first communication protocol is used for receiving individual video streams from the plurality of participant users and a second communication protocol distinct from the first is used for providing the mixed video stream to a multitude of live stream viewing users, which may optionally receive live streaming video from one or more media providers.

As further described in connection with FIG. 3A below, in some embodiments mixing server 310 receives multiple streams and other multimedia assets and descriptors to render a composite video stream. In some such embodiments, mixing server 310 renders the composite video in connection with a simulated-display browser rendering engine running on mixing server 310. A simulated-display browser rendering engine operates like a web browser in that it renders a web page based on a rendering template such as, for example, HTML or other web-based markup in order to render various components of a mixed set of video streams, generating a single stream from the individual streams and any associated text and graphics (as show in FIG. 2. The simulated display browser, however, is not necessarily connected to a physical display. Instead (or in addition), the visual components of the associated simulated display may be mapped to a storage location or memory associated with mixing server 310 in such a way that the simulated display can nevertheless be subject to a simulated screen capture process, whereby a single video stream video of the simulated display is captured and persisted to a shared memory associated with mixing server 310. In some embodiments, the shared memory may be an operating-system-based file system that implements concurrency controls so that multiple processes may read from the composite video stream while mixing server 310 continually adds contents to the video stream.

Mixing server 310 may be a dedicated server, a shared server, a virtual machine instance in a cloud computing environment, or any other form of computing device discussed above with respect to FIG. 1. Mixing server 310 may also be implemented in connection with containers (e.g., DOCKER-style containers) as provided by platform-as-a-service (PaaS) technologies with virtualized host operating systems or with any number of serverless PaaS technologies.

Although a single mixing server 310 is depicted, embodiments with multiple such services are also contemplated to provide scale, redundancy and/or isolation between different instances of a composite video live streaming platform. For example, a live stream organizer hosting a private live stream in which viewers register under a non-disclosure agreement may not wish to have the confidential live stream hosted on the same system as another live stream organizer's live stream, for security reasons. Moreover, a live stream with a large number of participants or potential guests may require multiple instances of mixing server 310 for scaling purposes to provide sufficiently performant interactive response times that are adequate to provide an acceptable user experience.

In some embodiments, once the simulated browser rendering engine associated with mixing server 310 has rendered composite video frames and the rendered composite video frames have been captured and persisted to a shared memory associated with mixing server 310, the captured frames may be encoded in connection with encoder 312 into an encoded format that is compatible with various media providers such as media provider 316, media provider 318, and media provider 320. These various media providers may correspond to any type of social media platform that facilitates live streaming. In some embodiments, encoder 312 may be implemented in connection with a video encoding service that receives a stream of frames and produces an encoded video stream. For example, one such video encoding service, FFmpeg, provides a suite of libraries and programs for processing multimedia files and streams. In some alternative embodiments, after encoder 312 encodes the captured frames, a subsequent video stream encoding process 314 carries out post-processing encoding to, for example, encode additional information or change a video format or associated compression scheme associated with the composite video stream being provided to media provider 320.

Figure 3B:
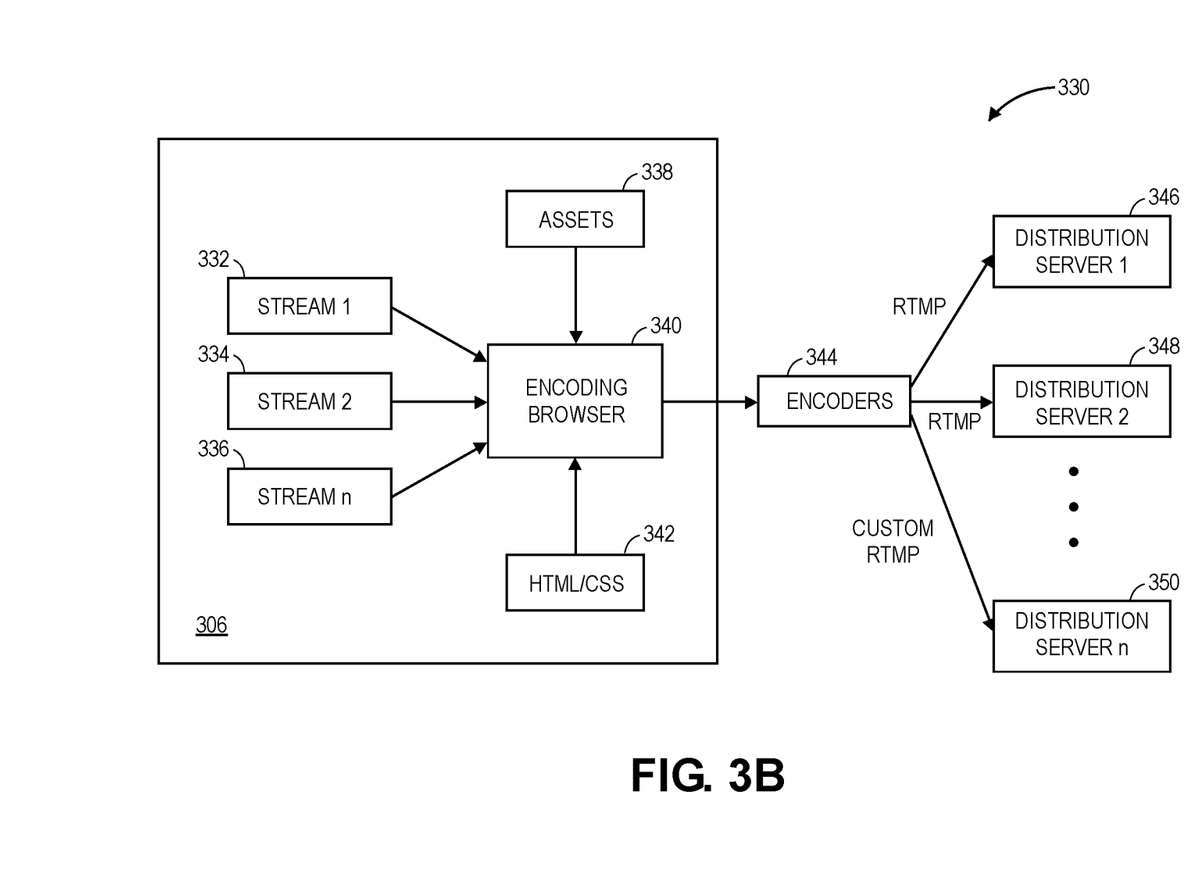
FIG. 3B illustrates elements of a system for carrying out alternative embodiments of the invention.

FIG. 3B illustrates elements of a system 330 for carrying out alternative embodiments of the invention. System 330 depicts an expanded view of media server 306 in which media server 306 takes on the roles of media server as well as mixing server 310 and capturing server 308 for ease of description. In these embodiments, multiple streams such as stream 332, stream 334, and stream 336 are received into media server 306 and processed in connection with encoding browser 340. In some embodiments, encoding browser 340 is a simulated display browser that relies on a web browser rendering engine to render a simulated web page, which rendered page is not necessarily sent to a physical display but merely rendered in a memory that could be forwarded to a physical display but could also be further processed and/or captured. In some embodiments, encoding browser 340 employs a modified version of a browser rendering engine, such as CHROMIUM, that renders its display to a virtual display server such as a graphical windowing display server. It is an advantage of such an approach that the existing layout and video decoding capabilities of encoding browser 340 can be utilized rather than writing a custom video decoder/layout/rendering engine for each layout of video which might be used in the video event hosting service. In some such embodiments, a network-capable sound server is employed to process an audio stream associated with the audiovisual streams received by encoding browser 340. In other embodiments, a voice chat mixing service such as OPENTALK is used to process the audio streams for communication among the participants as well as the audio portion of the combined video stream.

In some embodiments, a browser window layout as rendered and captured in connection with encoding browser 340 is formatted in connection with HTML and/or CSS from formatting source 342. Additionally, or in the alternative, assets 338 are provided to encoding browser 340 so that encoding browser 340 may render various graphical assets in connection with the rendered composite video stream such that assets 338 may represent backgrounds, logos, and/or other graphics to augment the composite video stream and provide a consistent branding experience, etc., consistent with the depiction in FIG. 2.

In some embodiments, the output from encoding browser 340 is provided to subsequent downstream encoders 344. As described above in connection with FIG. 3A, such encoders may provide an output in RTMP format as needed by social media platforms or other distribution servers such as distribution server 346, distribution server 348, or distribution server 350. As shown in FIG. 3B distribution server 346 receives a live stream according to an RTMP protocol corresponding to distribution server 346 and distribution server 348, which may be, for example YOUTUBE. Also illustrated is a custom RTMP protocol for sending a live stream to distribution server 350 which distribution server may receive an arbitrary RTMP live stream for distributing to other users.

Figure 3C:
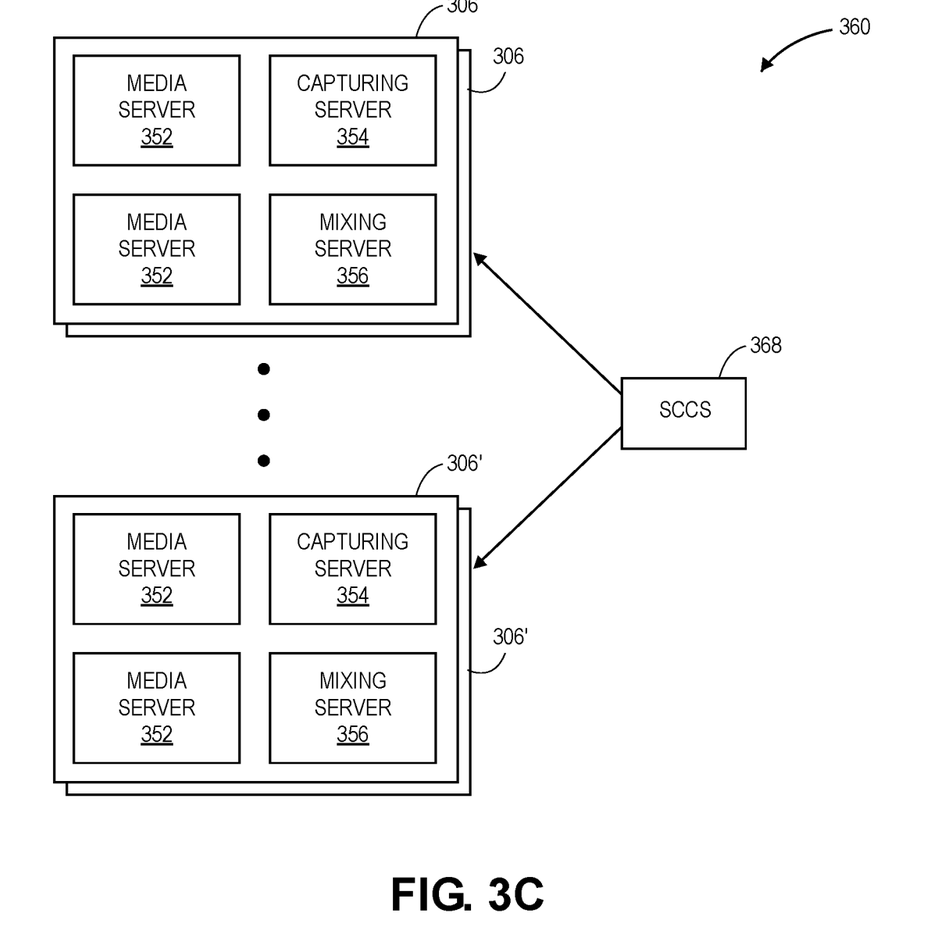
FIG. 3C illustrates elements of a system for carrying out software updates in connection with embodiments of the invention.

FIG. 3C illustrates elements of a system 360 for carrying out software updates in connection with embodiments of the invention. In some embodiments, software updates must be performed without any planned outages associated with the live streaming platform. In some such embodiments, software updates may be rolled out in advance of hosting a scheduled live stream. For example, many live streams are scheduled in advance to begin at a certain time on the hour. In such a scenario, multiple instances of alternative media server 306 running a certain version of multiple software components may be provisioned in advance. In some embodiments, such provisioning takes place according to provisioning microservices associated with various hyperscalers whose services may be used by a particular live streaming platform provider. For example, in the case of Google Cloud Platform and Kubernetes, a particular media server 306 may be provisioned and associated software code pushed out to the newly provisioned server from source code control system 368, which may be, for example GITHUB or any other source code control system capable of providing source code packages associated with a particular build version.

In some embodiments, where an instance that is providing live streaming crashes, a new set of services may be quickly provisioned and a latest stable version of code pushed out to the newly provisioned set of services. Such a scenario is not ideal because it is likely that a detectable delay (e.g., 2 seconds or more) in the live streaming stream will be experienced by users. However, in the case of a service outage, a brief delay is preferable to a termination of the live streaming experience. In some embodiments, critical source code updates may be pushed out to newly provisioned resources in such a way that an unavoidable disruption in a live stream will occur. Similarly, in some unusual cases where live streams persist and continue over the course of several months, it may be necessary to push out a new version of code. In such a case, such outages can be planned at a time of relatively lower live stream resource utilization such as, for example, nighttime, where it has been observed that only approximately one fifth as many viewers are present as during daytime live streaming sessions.

Figure 4:
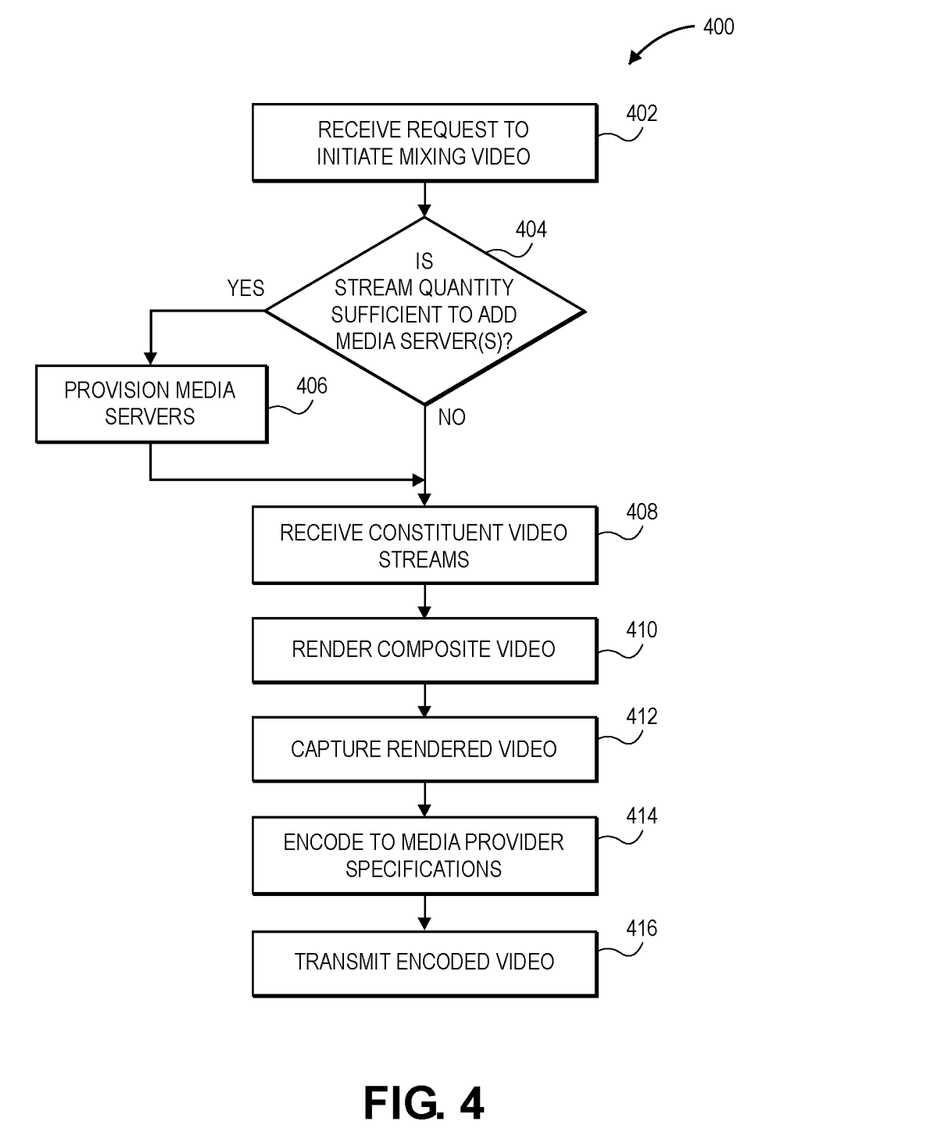
FIG. 4 depicts a flowchart illustrating the operation of a method in accordance with embodiments of the invention.

FIG. 4 depicts a flowchart illustrating the operation of method 400 in accordance with various embodiments of the invention. In some embodiments, method 400 is a method of processing composite streaming video in connection with a centralized service.

At step 402, a request is received at the centralized service to initiate mixing a composite video live stream. In some embodiments, the request may originate from a live streaming organizer in composition preview mode. For example, as a live streaming organizer configures the live stream, it may be beneficial to preview what the live stream will look like when it is in production.

In some other embodiments, the request originates from a live streaming organizer who is beginning the actual live stream in production. In some embodiments, the request includes a constituent stream quantity associated with one or more constituent video streams. In these embodiments the constituent stream quantity corresponds to a number of presenting users whose video streams will be mixed to form a composite video stream. In some embodiments, the request further includes one or more streaming video assets. A streaming video asset may be a graphic image, a background, other video to be added to the composition, one or more logos, textual items, or scrolling text. In some embodiments, the request further includes one or more media provider identifiers associated with one or more media providers for disseminating the composite video live stream. In various embodiments, the media providers may be social media platforms such as YOUTUBE that facilitate large-scale distribution of a live stream based on the composite video stream produced in connection with method 400.

At test 404, it is determined whether an associated quantity of streams is sufficient to add additional media servers. In some embodiments, a single media server is employed, and as the quantity of streams to be mixed into the composite video stream increases, the size of the associated media server is increased to accommodate the larger number of streams. In some alternative embodiments, the number of media servers is increased. In some such embodiments, the media servers communicate among each other in a tree-based hierarchy, exchanging information about the respective video streams being received at each of the media servers. In some embodiments, the one or more constituent video streams is received, at a capturing server, in a lossless format. Specifically, when a particular client device has both adequate processing power as well as adequate network bandwidth, a full quality video stream may be uploaded directly or indirectly to the capturing server in parallel with the streaming video being provided by the particular client. In situations where computing and/or bandwidth resources are inadequate, a full quality version of the video being recorded may be stored locally (to a client device) and uploaded after the fact. A benefit of uploading a full quality version of each of the constituent streams is that having a high-quality single stream may be helpful in terms of post-production editing to work with individual constituent streams and re-render them after the fact, for example to remove cross talk, a dog barking, or a cough, etc.

If it is determined at test 404 that the constituent stream quantity is sufficient to warrant provisioning one or more subsequent media servers, the one or more subsequent media servers are provisioned. In these embodiments, server provisioning takes place according to policies and processes of the corresponding hyperscaling cloud provider. In some embodiments, Kubernetes is employed to facilitate scaling up or down a number of servers as well as in connection with provisioning new servers. In some embodiments, a new set of software having a latest stable version is applied to the newly provisioned servers. In these embodiments, software upgrades are performed as described in connection with FIG. 3C above.

At step 408, the one or more constituent video streams and the one or more streaming video assets are received at a mixing server. In some embodiments, the mixing server is utilized to receive the constituent video streams as well as the streaming video assets, which may be rendered in the next step according to layout specified in HTML and/or CSS that specifies where in a particular screen layout the various components (i.e., video streams and graphics) should be rendered.

At step 410, the composite video live stream is rendered based on the one or more constituent video streams and the one or more streaming video assets. In some embodiments, a server-side browser with a simulated display renders the various components of the composite video being rendered by the server-side browser. In some such embodiments, the server-side browser has only a simulated display that is optionally never displayed on a physical device. It is understood that using techniques associated with the X Window System protocol such a simulated display may be redirected to an actual display, for debugging purposes, for example. In these embodiments, the streaming video assets may include graphics as well as layout specifications (such as HTML) to define how the composite video live stream should be rendered.

At step 412, the rendered composite video live stream is captured as a plurality of captured frames (screen capture). In some embodiments, a screen capture application is utilized to capture video from the simulated display associated with the mixing server that is rendering the composite video live stream. In some such embodiments, a number of frames per second may be defined in advance or such a parameter may be dynamically calculated based on an amount of visible change that is occurring in the live stream over a predetermined period. For example, when a live stream is unchanged in appearance over a period of time, a single frame per second will not look different than sixty frames per second. On the other hand, where there is a lot of rapid movement in a live stream a higher frequency will yield smoother video in the composite video stream, at the potential cost of requiring more bandwidth and storage for an associated live stream.

At optional step 414, the plurality of captured frames is encoded into a standardized encoded video stream. Performing a standardized encoding step has the advantage of pre-producing a composite video stream in a standardized format that can conveniently be re-transcoded into other formats as needed to push out subsequent live streams to various media providers. In some embodiments, the standardized encoded video stream is a Moving Picture Experts Group version 4 (MP4) encoded video stream. In some other embodiments, relatively small chunks of encoded video are persisted in various container formats using various codecs to avoid the necessity of caching large chunks of streaming video. For example, such video chunks may be persisted as four-second video segments encoded using an MPEG-2 codec format in a Transport Stream container file. It is understood that a single step encoding process may be employed as well, particularly when only a single media provider is to be utilized. In some embodiments, the standardized encoded video stream is then persisted onto one or more shared memories. In some embodiments, such shared memories may include a file system. In some such embodiments, such a file system employs concurrency control techniques, such as file locking, to facilitate multiple processes producing and consuming a corresponding composite video stream.

In some embodiments, in response to determining that the one or more media providers are configured to receive a provider-specific encoded media stream, the standardized encoded video stream may be encoded into the provider-specific encoded media stream as defined by a particular media provider. Finally, at step 416, the provider-specific encoded media stream is transmitted to a corresponding media provider in the one or more media providers. In some embodiments, the one or more media providers is a social media platform providing live streaming video in connection with one or more video distribution servers.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein, without departing from the scope of the invention as recited in the claims.

The invention claimed is:

1. One or more non-transitory computer-readable media storing computer-executable instructions that, when executed by at least one processor, perform a method of processing composite video live streams, the method comprising:

receiving, at a centralized service, a request to initiate mixing a composite video live stream, the request indicating one or more participant video streams and one or more streaming video assets, wherein the centralized service comprises a video processing service for generating the composite video live stream, wherein the video processing service employs a web browser configured to render the composite video live stream in memory;

receiving, at the video processing service, the one or more participant video streams and the one or more streaming video assets;

rendering, in the memory and by the web browser, the composite video live stream based on the one or more participant video streams and the one or more streaming video assets;

capturing, by the video processing service, the composite video live stream by performing a simulated screen capture of the composite video live stream from the memory; and transmitting the composite video live stream to one or more media providers for broadcasting to a plurality of viewers.

2. The one or more non-transitory computer-readable media of claim 1, the method further comprising:

encoding the composite video live stream into a standardized video encoding format.

3. The one or more non-transitory computer-readable media of claim 2, the method further comprising:

based on a determination that a media provider of the one or more media providers requires a specific video encoding format, transcoding the composite video live stream from the standardized video encoding format into the specific video encoding format.

4. The one or more non-transitory computer-readable media of claim 1, wherein each of the one or more participant video streams is associated with a corresponding participant client device, wherein at least one participant video stream is configured to be stored as a lossless recording on the corresponding participant client device, and wherein the method further comprises: after an end of the composite video live stream, receiving the lossless recording from the corresponding participant client device.

5. The one or more non-transitory computer-readable media of claim 1, wherein the one or more streaming video assets comprises at least one of a graphic image or a textual item.

6. The one or more non-transitory computer-readable media of claim 1, further comprising, the method further comprising:

provisioning at least one other instance of the centralized service, the at least one other instance running a first software version distinct from a second software version of the video processing service; and responsive to an outage in the centralized service, transitioning the composite video live stream to be hosted by the at least one other instance.

7. The one or more non-transitory computer-readable media of claim 1, the method further comprising:

storing chunks of the composite video live stream in at least one container; and encoding the chunks into a specific video encoding format for each of the one or more media providers.

8. A method of processing composite streaming videos in connection with centralized services, the method comprising:

receiving, at a centralized service, a request to initiate a composite video live stream;

responsive to receiving the request, initiating the composite video live stream, the composite video live stream comprising a plurality of participants;

receiving, at a video processing service associated with the composite video live stream, a plurality of participant video streams from each of the plurality of participants, wherein the video processing service is configured to employ a web browser rendering engine for rendering the composite video live stream;

rendering, in memory and by the web browser rendering engine, the composite video live stream based on the plurality of participant video streams and at least one graphical asset;

capturing, by the video processing service, the composite video live stream by performing a simulated screen capture of the composite video live stream from the memory;

encoding the composite video live stream in a video encoding format, the video encoding format selected based on a media provider for the composite video live stream; and transmitting the composite video live stream to the media provider for broadcasting to a plurality of viewers.

9. The method of claim 8, further comprising:

causing display of a composition preview mode user interface for configuring a layout of the composite video live stream, wherein the request to initiate the composite video live stream is received within a composition preview mode for the composite video live stream.

10. The method of claim 8, further comprising:

receiving an instruction to transmit the composite video live stream to at least one additional media provider;

responsive to receiving the instruction, encoding the composite video live stream in an additional video encoding format associated with the at least one additional media provider; and transmitting the composite video live stream to the at least one additional media provider for broadcasting to an additional plurality of viewers.

11. The method of claim 8, wherein the web browser rendering engine is configured to render the composite video live stream based on a web-based markup.

12. The method of claim 8, further comprising:

causing an outage in the centralized service at a time selected based on resource utilization associated with the composite video live stream;

deploying an updated instance of the centralized service; and reconnecting the plurality of participants and the plurality of viewers to the composite video live stream.

13. The method of claim 8, wherein the memory is a shared memory allowing multiple processes to read from the shared memory while additional video stream contents are added to the composite video live stream.

14. The method of claim 8, further comprising:

storing chunks of the composite video live stream in at least one container; and encoding the chunks into a specific video encoding format for the media provider.

15. A system for composite video live streaming, the system comprising:

at least one server comprising a video processing service, the video processing service employing a web browser configured to render a composite video live stream; and at least one processor and at least one non-transitory memory storing computer executable instructions that when executed by the at least one processor cause the system to carry out actions comprising:

receiving a request to initiate the composite video live stream, the composite video live stream comprising a plurality of video streams and one or more streaming video assets;

rendering, in memory and by the web browser, the composite video live stream;

capturing, by the video processing service, the composite video live stream by performing a simulated screen capture of the composite video live stream from the memory;

encoding, by the video processing service, the composite video live stream; and transmitting the composite video live stream to a plurality of media providers, each media provider configured to broadcast the composite video live stream to a distinct plurality of viewers.

16. The system of claim 15, wherein the memory is an operating-system-based file system that implements concurrency controls.

17. The system of claim 15, wherein encoding the composite video live stream comprises encoding the composite video live stream in a first encoding format for a first media provider of the plurality of media providers and encoding the composite video live stream in a second encoding format distinct from the first encoding format for a second media provider of the plurality of media providers.

18. The system of claim 15, wherein the composite video live stream is rendered based on a rendering template, the rendering template defining rendering locations for at least one of the one or more streaming video assets.

19. The system of claim 15, the actions comprising:

storing chunks of the composite video live stream in at least one container; and encoding the chunks into a specific video encoding format for each of the plurality of media providers.

20. The system of claim 15, wherein the composite video live stream is rendered based on a web-based markup.

* * * * *

UNITED STATES PATENT AND TRADEMARK OFFICE
CERTIFICATE OF CORRECTION

| | | Page 1 of 1 |
|---|---|---|
| PATENT NO. | : 12,126,843 B2 | |
| APPLICATION NO. | : 18/315874 | |
| DATED | : October 22, 2024 | |
| INVENTOR(S) | : Dan Briggs and Geige Vandentop | |

It is certified that error appears in the above-identified patent and that said Letters Patent is hereby corrected as shown below:

On the Title Page

Item (73) should read as follows:
StreamYard, Inc., New York, NY (US)

Signed and Sealed this
Seventh Day of January, 2025

Derrick Brent
*Acting Director of the United States Patent and Trademark Office*